(12) United States Patent
Kamon et al.

(10) Patent No.: US 8,086,032 B2
(45) Date of Patent: Dec. 27, 2011

(54) IMAGE PROCESSING DEVICE, IMAGE PROCESSING METHOD, AND IMAGE PICKUP APPARATUS

(75) Inventors: Koichi Kamon, Otokuni-gun (JP); Tetsuya Katagiri, Kyoto (JP); Kazuchika Sato, Kobe (JP)

(73) Assignee: Konica Minolta Opto, Inc., Tokyo (JP)

( * ) Notice: Subject to any disclaimer, the term of this patent is extended or adjusted under 35 U.S.C. 154(b) by 563 days.

(21) Appl. No.: 12/211,308

(22) Filed: Sep. 16, 2008

(65) Prior Publication Data

US 2009/0080771 A1    Mar. 26, 2009

(30) Foreign Application Priority Data

Sep. 21, 2007  (JP) ................. 2007-245720

(51) Int. Cl.
   *G06K 9/36*  (2006.01)
(52) U.S. Cl. ..................... 382/166; 382/274
(58) Field of Classification Search .......... 382/162, 382/163, 166, 167, 190, 199, 232, 260, 274; 358/1.9, 518, 520
   See application file for complete search history.

(56) References Cited

U.S. PATENT DOCUMENTS

| | | | |
|---|---|---|---|
| 6,771,838 B1 * | 8/2004 | Fan | 382/274 |
| 6,987,544 B2 | 1/2006 | Ogata et al. | 348/678 |
| 7,826,658 B2 | 11/2010 | Sato et al. | 348/315 |
| 2003/0012448 A1 * | 1/2003 | Kimmel et al. | 382/274 |
| 2005/0073702 A1 * | 4/2005 | Shaked et al. | 358/1.9 |
| 2006/0055794 A1 | 3/2006 | Sato et al. | 348/222.1 |

FOREIGN PATENT DOCUMENTS

| | | |
|---|---|---|
| JP | 2003-8898 A | 1/2003 |
| JP | 2003-333610 A | 11/2003 |
| JP | 2007-134777 A | 5/2007 |

OTHER PUBLICATIONS

Japanese Notice of Reasons for Rejection dated Aug. 23, 2011, for counterpart Japanese Application No. 2007-245720, together with an English translation thereof.

\* cited by examiner

*Primary Examiner* — Duy M Dang
(74) *Attorney, Agent, or Firm* — Cozen O'Connor

(57) ABSTRACT

An illumination component extractor is operable to extract an illumination component from input image data by: performing a smoothing process a certain number of times to generate a plurality of smooth image data having resolutions different from one another from the input image data, the smoothing process including an operation of filtering the input image data with use of a low-pass filter having a predetermined size and an operation of downsampling the filtered input image data; and performing an inverse-smoothing process a certain number of times, the inverse-smoothing process including an operation of replacing an edge portion of a smooth image data having a lower resolution with a smooth image data having a higher resolution, and an operation of upsampling the replaced smooth image data. The input image data is color image data which has been obtained by an image sensor including a number of pixels having different spectral sensitivities.

21 Claims, 7 Drawing Sheets

FIG. 6

| D00 | D01 | D02 | D03 | D04 | D05 |
|-----|-----|-----|-----|-----|-----|
| D10 | D11 | D12 | D13 | D14 | D15 |
| D20 | D21 | D22 | D23 | D24 | D25 |
| D30 | D31 | D32 | D33 | D34 | D35 |
| D40 | D41 | D42 | D43 | D44 | D45 |

FIG. 7A

| D00 | D01 | D02 | D03 | D04 | D05 |
|-----|-----|-----|-----|-----|-----|
| D10 | D11 | D12 | D13 | D14 | D15 |
| D20 | D21 | D22 | D23 | D24 | D25 |
| D30 | D31 | D32 | D33 | D34 | D35 |
| D40 | D41 | D42 | D43 | D44 | D45 |

FIG. 7B

| D00 | D02 | D04 |
|-----|-----|-----|
| D20 | D22 | D24 |
| D40 | D42 | D44 |

FIG. 8A

| D00 | D02 | D04 |
|-----|-----|-----|
| D20 | D22 | D24 |
| D40 | D42 | D44 |

FIG. 8B

| D00 | D01 | D02 | D03 | D04 | D05 |
|-----|-----|-----|-----|-----|-----|
| D10 | D11 | D12 | D13 | D14 | D15 |
| D20 | D21 | D22 | D23 | D24 | D25 |
| D30 | D31 | D32 | D33 | D34 | D35 |
| D40 | D41 | D42 | D43 | D44 | D45 |

FIG. 9

| D00 | D01 | D02 | D03 | D04 | D05 |
|-----|-----|-----|-----|-----|-----|
| D10 | D11 | D12 | D13 | D14 | D15 |
| D20 | D21 | D22 | D23 | D24 | D25 |
| D30 | D31 | D32 | D33 | D34 | D35 |
| D40 | D41 | D42 | D43 | D44 | D45 |

FIG. 10A

| R00 | G01 | R02 | G03 | R04 | |
|-----|-----|-----|-----|-----|---|
| G10 | B11 | G12 | B13 | G14 | |
| R20 | G21 | R22 | G23 | R24 | |
| G30 | B31 | G32 | B33 | G34 | |
| | | | | | |

FIG. 10B

| D00 | D02 | D04 | | | |
|-----|-----|-----|---|---|---|
| D20 | D22 | D24 | | | |
| D40 | D42 | D44 | | | |
| | | | | | |
| | | | | | |

FIG. 11

| R00 | G01 | R02 | G03 | R04 | |
|-----|-----|-----|-----|-----|--|
| G10 | B11 | G12 | B13 | G14 | |
| R20 | G21 | R22 | G23 | R24 | |
| G30 | B31 | G32 | B33 | G34 | |
| | | | | | |

FIG. 12

| Cy | Ye | Cy | Ye | Cy | |
|----|----|----|----|----|--|
| G | Mg | G | Mg | G | |
| Cy | Ye | Cy | Ye | Cy | |
| G | Mg | G | Mg | G | |
| | | | | | |

IMAGE PROCESSING DEVICE, IMAGE PROCESSING METHOD, AND IMAGE PICKUP APPARATUS

This application is based on Japanese Patent Application No. 2007-245720 filed on Sep. 21, 2007, the contents of which are hereby incorporated by reference.

BACKGROUND OF THE INVENTION

1. Field of the Invention

The present invention relates to an image processing technology for compressing the dynamic range of input image data.

2. Description of the Related Art

Japanese Unexamined Patent Publication No. 2003-8898 discloses a technology directed to realizing a smoothing process without using a large-sized filter, with substantially the same effect and operation as in the case of using a large-sized filter. In this technology, an illumination component is extracted from the input image data by: generating multiple smooth image data whose degree of smoothness is different from each other from input image data; calculating an edge intensity based on the multiple smooth image data; and combining the multiple smooth image data based on the calculated edge intensity.

The above publication, however, has no disclosure on an arrangement as to how color image data obtained by an image sensor having different spectral sensitivities with respect to each of the pixels is processed. Accordingly, in the technology disclosed in the publication, it may be impossible to precisely extract an illumination component from color image data.

SUMMARY OF THE INVENTION

It is an object of the present invention to provide an image processing device, an image processing method, and an image pickup apparatus that enable to solve the problems residing in the conventional art.

An image processing device according to an aspect of the invention includes: an illumination component extractor for extracting an illumination component from input image data; a reflectance component extractor for extracting a reflectance component from the input image data based on the illumination component extracted by the illumination component extractor; a compressor for compressing a dynamic range of the illumination component extracted by the illumination component extractor; and a combiner for combining the illumination component whose dynamic range is compressed by the compressor with the reflectance component extracted by the reflectance component extractor. The illumination component extractor is provided with: a smoothing section for performing a smoothing process a certain number of times to generate a plurality of smooth image data having resolutions different from one another from the input image data, the smoothing section including a filtering section for filtering the input image data with use of a low-pass filter having a predetermined size, and a downsampling section for downsampling the filtered input image data; and an inverse-smoothing section for performing an inverse-smoothing process a certain number of times, the inverse-smoothing section including an edge operating section for replacing an edge portion of a smooth image data having a lower resolution with a smooth image data having a higher resolution, and an upsampling section for upsampling the replaced smooth image data. The input image data is color image data which has been obtained by an image sensor including a number of pixels having different spectral sensitivities.

An image processing method according to another aspect of the invention includes the steps of: extracting an illumination component from input image data; extracting a reflectance component from the input image data based on the illumination component extracted in the illumination component extracting step; compressing a dynamic range of the illumination component extracted in the illumination component extracting step; and combining the illumination component whose dynamic range is compressed in the compressing step with the reflectance component extracted in the reflectance component extracting step. The illumination component is extracted from the input image data by performing a smoothing process a certain number of times to generate a plurality of smooth image data having resolutions different from one another from the input image data, the smoothing process including an operation of filtering the input image data with use of a low-pass filter having a predetermined size and an operation of downsampling the filtered input image data and performing an inverse-smoothing process a certain number of times, the inverse-smoothing process including an operation of replacing an edge portion of a smooth image data having a lower resolution with a smooth image data having a higher resolution, and an operation of upsampling the replaced smooth image data. The input image data is color image data which has been obtained by an image sensor including a number of pixels having different spectral sensitivities.

An image pickup apparatus according to yet another aspect of the invention includes the aforementioned image processing device.

These and other objects, features and advantages of the present invention will become more apparent upon reading the following detailed description along with the accompanying drawings.

BRIEF DESCRIPTION OF THE DRAWINGS

FIG. 6 is a schematic diagram showing an operation to be performed by an LPF section shown in FIG. 5.

FIG. 7A is a schematic diagram showing an operation to be performed by a downsampling section shown in FIG. 5, specifically showing image data before a downsampling operation is performed.

FIG. 7B is a schematic diagram showing an operation to be performed by the downsampling section shown in FIG. 5, specifically showing image data after the downsampling operation is performed.

FIG. 8A is a diagram showing an upsampling operation, specifically showing image data before an upsampling operation is performed.

FIG. 8B is a diagram showing an upsampling operation, specifically showing image data after the upsampling operation is performed.

FIG. 9 is a diagram showing an operation to be performed by an edge operating section shown in FIG. 5.

FIG. 10A is a diagram showing a downsampling operation to be performed by a smoothing section in a second embodiment of the invention, specifically showing image data before a downsampling operation is performed.

FIG. 10B is a diagram showing a downsampling operation to be performed by the smoothing section in the second embodiment of the invention, specifically showing image data after the downsampling operation is performed.

FIG. 11 is a diagram showing image data having an RGB Bayer arrangement to be processed.

FIG. 12 is a diagram showing image data having a complementary color filter arrangement to be processed.

DETAILED DESCRIPTION OF THE PREFERRED EMBODIMENTS OF THE INVENTION

First Embodiment

Figure 1:
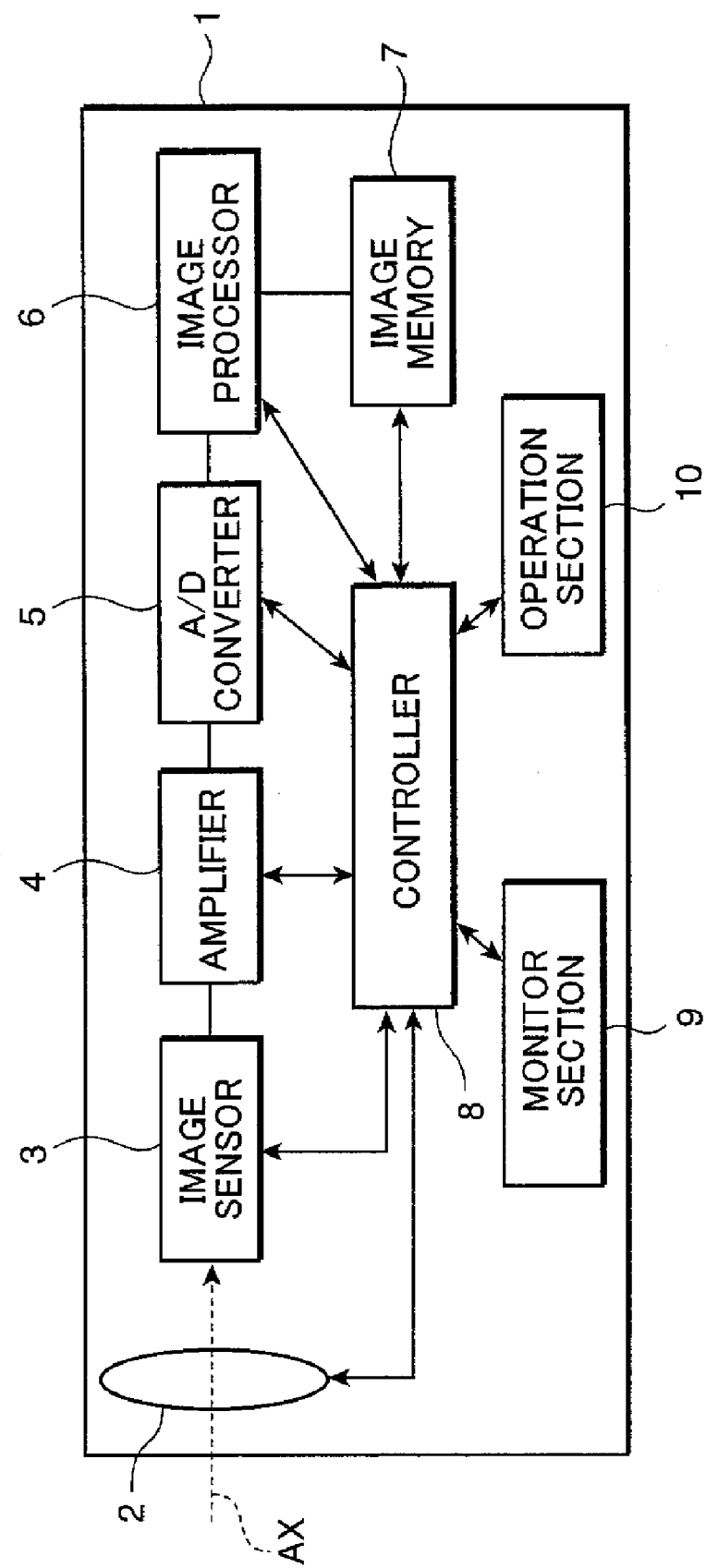
FIG. 1 is a block diagram of an image pickup apparatus in accordance with a first embodiment of the invention.

In the following, an image pickup apparatus in accordance with a first embodiment of the invention is described FIG. 1 is a block diagram of an image pickup apparatus in accordance with the first embodiment of the invention. As shown in FIG. 1, the image pickup apparatus 1 is constituted of a digital camera, and includes a lens section 2, an image sensor 3, an amplifier 4, an A/D converter 5, an image processor 6 as an example of an image processing device, an image memory 7, a controller 8, a monitor section 9, and an operation section 10.

The lens section 2 is constituted of an optical lens system for receiving a light image of a subject, and guiding the light image to the image sensor 3. The optical lens system may include a zoom lens, a focus lens, and other fixed lens block arranged in series along the optical axis AX of the subject light image. The lens section 2 includes a diaphragm (not shown) and a shutter (not shown) for adjusting the amount of light transmitted through the lens section 2. Driving of the diaphragm and the shutter is controlled under the control of the controller 8.

The image sensor 3 photoelectrically converts the light image formed on a light receiving surface of the image sensor 3 through the lens section 2 to generate image data of respective color components having a level in accordance with the received light amount, and outputs the image data to the amplifier 4. In this embodiment, the image sensor 3 may be one of a variety of image sensors such as a CMOS image sensor, a VMIS image sensor, and a CCD image sensor.

The amplifier 4 includes an AGC (auto gain control) circuit and a CDS (correlation double sampling) circuit, and amplifies image data outputted from the image sensor 3. The A/D converter 5 converts the image data amplified by the amplifier 4 into digital image data. In this embodiment, image data indicating light received on each of the pixels of the image sensor 3 is converted into pixel data having a gradation value of 12 bits.

The image processor 6 performs various image processings such as FPN (fixed pattern noise) correction, black reference correction, and white balance correction with respect to the image data outputted from the A/D converter 5; and also performs an image processing to be described later referring to FIG. 5. Hereinafter, image data inputted to the image processor 6 is called as input image data, and described as such. The image memory 7 is constituted of an RAM (Random Access Memory), and stores image data or the like which has undergone image processing by the image processor 6.

The controller 8 includes an ROM for storing various control programs and the like, an RAM for temporarily storing data, and a CPU (Central Processing Unit) for reading out the control programs and the like from the ROM for execution. The controller 8 controls overall operations of the image pickup apparatus 1.

The monitor section 9 includes a color liquid crystal display device to be mounted on a rear surface of a housing of the image pickup apparatus 1, and displays, on a monitor screen thereof, image data picked up by the image sensor 3, image data stored in the image memory 7, or the like.

The operation section 10 includes various operation switches such as a power source switch, a release switch, a mode setting switch for setting various image shooting modes, and a menu selecting switch. In response to user's depressing the release switch, a series of photographing operations including an image pickup operation of picking up a subject image by the image sensor 3, performing a predetermined image processing with respect to image data acquired by the image pickup operation, and recording the image data into the image memory 7 or a like device are performed. Alternatively, the series of photographing operations may be terminated by outputting the image data from the image processor 6 as a digital signal, or as an analog signal such as an NTSC signal after D/A conversion, without storing the image data into the image memory 7 or the like device.

Figure 2:
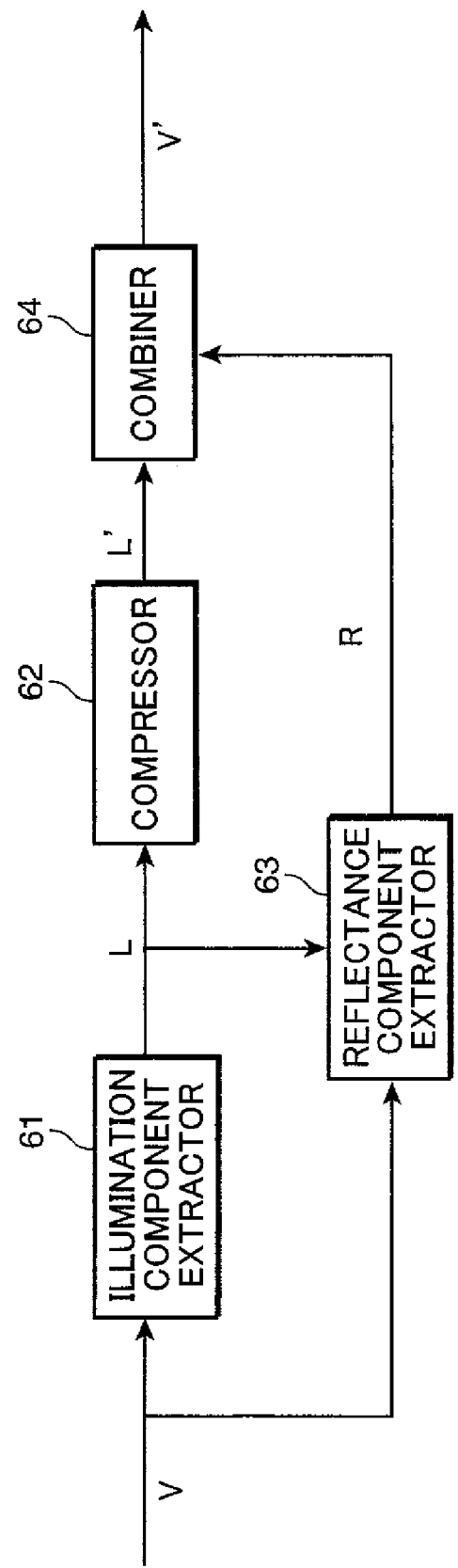
FIG. 2 is a block diagram showing an arrangement of an image processor shown in FIG. 1.

FIG. 2 is a block diagram showing an arrangement of the image processor 6 shown in FIG. 1. As shown in FIG. 2, the image processor 6 includes an illumination component extractor 61, a compressor 62, a reflectance component extractor 63, and a combiner 64.

The illumination component extractor 61 performs a smoothing process a certain number of times to generate a plurality of smooth image data having resolutions different from one another from the input image data V, the smoothing process executing an operation of filtering the input image data V with use of a low-pass filter having a predetermined size and an operation of downsampling the filtered input image data, and perform an inverse-smoothing process a certain number of times, the inverse-smoothing process executing an operation of replacing an edge portion of a smooth image data having a lower resolution with a smooth image data having a higher resolution, and an operation of upsampling the replaced smooth image data, thereby extracting an illumination component L from the input image data V. The process to be performed by the illumination component extractor 61 is described later in detail.

Figure 3:
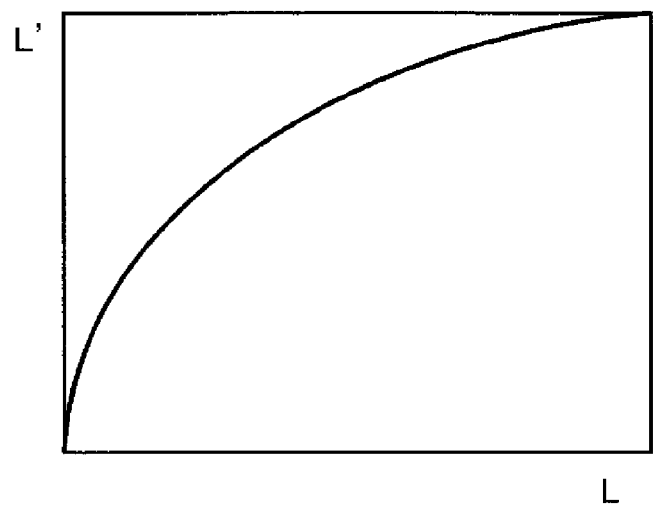
FIG. 3 is a graph showing a compression characteristic to be used by a compressor shown in FIG. 2.

The compressor 62 compresses the dynamic range of the illumination component L extracted by the illumination component extractor 61 with use of a predetermined compression characteristic. FIG. 3 is a graph showing a compression characteristic to be used by the compressor 62. In FIG. 3, the axis of ordinate indicates an illumination component L' after compression, and the axis of abscissas indicates an illumination component L before compression. As shown in FIG. 3, the compression characteristic has a characteristic that the illumination component L' increases with a moderate gradient in the form of a parabola, as the illumination component L increases. Specifically, the compressor 62 stores a lookup table in advance, wherein the respective values of the illumination component L, and the respective values of the illumination component L' corresponding to the respective values of the illumination component L are correlated to each other. The compressor 62 specifies the illumination component L' corresponding to the illumination component L of each pixel by referring to the lookup table. Alternatively, the compressor 62 may compress the dynamic range of the illumination component L by using a function of the compression characteristic shown in FIG. 3, in place of using the lookup table.

The reflectance component extractor 63 extracts a reflectance component R by dividing the input image data V by the illumination component L extracted by the illumination component extractor 61. The input image data V is expressed by the product of the illumination component L and the reflectance component R, i.e., V=R*L based on the Retinex theory. Accordingly, the reflectance component R can be extracted by implementing the equation: R=V/L.

Figure 4A:
FIG. 4A is a diagram showing a reflectance component.
Figure 4B:
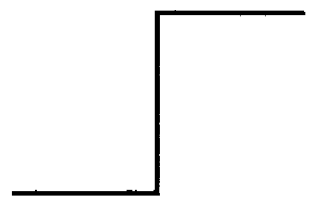
FIG. 4B is a diagram showing an illumination component.
Figure 4C:
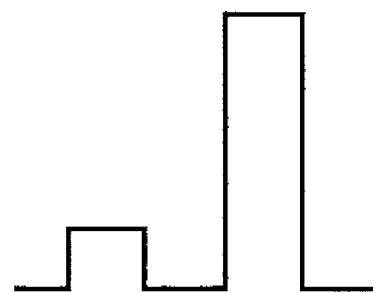
FIG. 4C is a diagram showing output image data in the case where the dynamic range of an illumination component is not compressed.
Figure 4D:
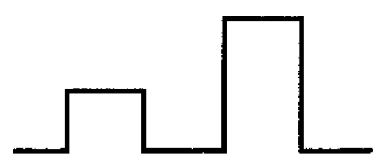
FIG. 4D is a diagram showing output image data in the case where the dynamic range of the illumination component is compressed.

The combiner 64 generates output image data V' by multiplying the illumination component L' by the reflectance component R, i.e., by implementing the equation: V'=R*L'. FIGS. 4A through 4D are schematic diagrams showing an effect to be obtained by compressing the dynamic range of the illumination component L. FIG. 4A shows a reflectance component, FIG. 4B shows an illumination component, FIG. 4C shows output image data in the case where the dynamic range of an illumination component is not compressed, and FIG. 4D shows output image data in the case where the dynamic range of the illumination component is compressed. In FIGS. 4A through 4D, the vertical direction indicates the value of a certain number of pixels constituting one frame of image data, i.e., the pixel value.

As shown in FIGS. 4A and 4B, as compared with the reflectance component, the illumination component has a characteristic that the pixel value greatly changes and that the area having the same pixel value is wide. Accordingly, in the case where the dynamic range of the illumination component is not compressed, as shown in FIG. 4C, the illumination component is dominant in a pixel where the ratio of the illumination component is large, and the reflectance component is not expressed, or less likely to be expressed. This makes it difficult to precisely reproduce detailed features of a photographed scene. In view of this, after the dynamic range of the illumination component is compressed, output image data is generated by multiplying the compressed illumination component by the reflectance component. Then, as shown in FIG. 4D, this can eliminate the drawback that the illumination component may be dominant in a pixel where the ratio of the illumination component is large. This enables to precisely reproduce detailed features of a photographed scene.

Figure 5:
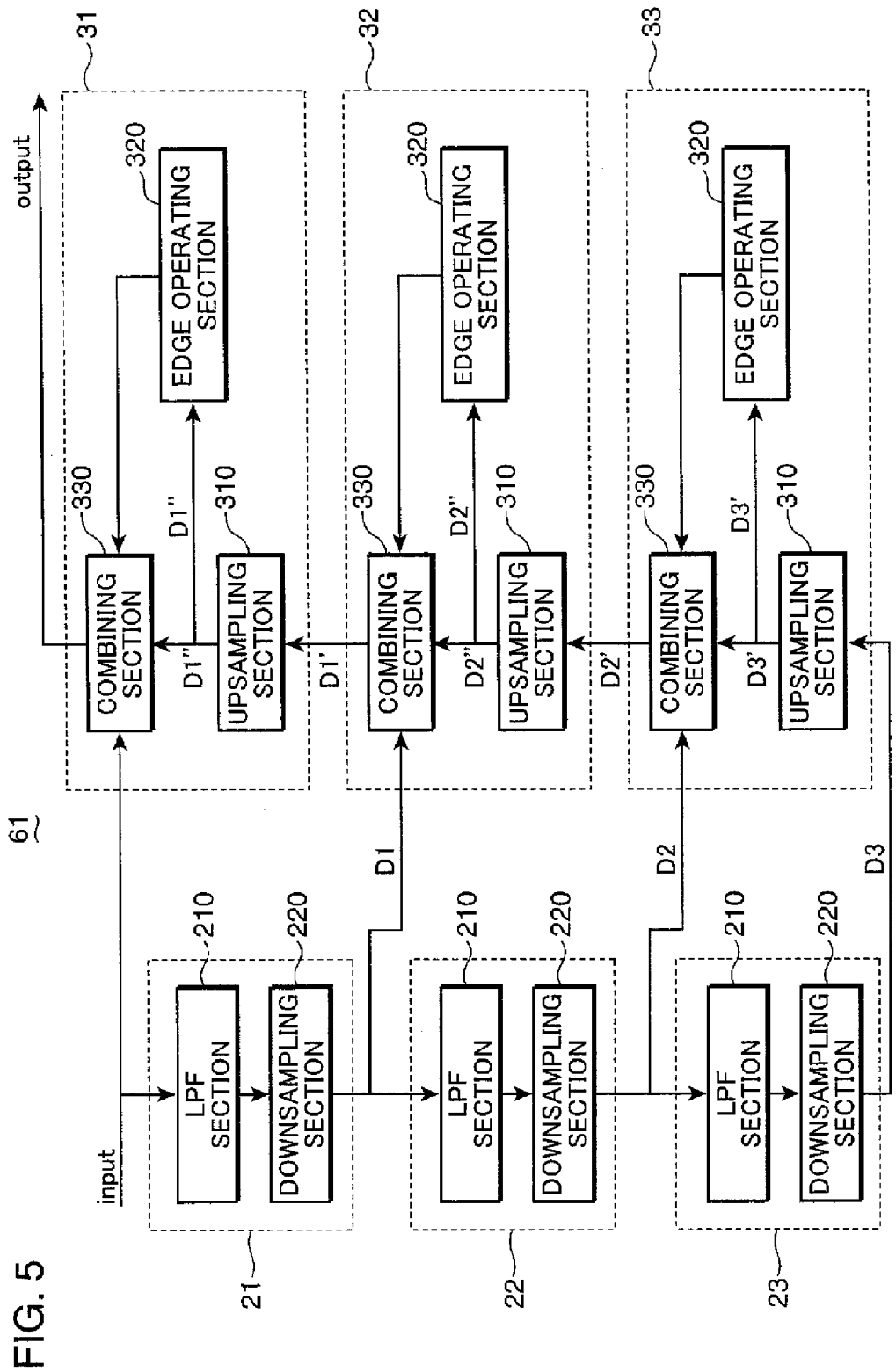
FIG. 5 is a block diagram showing a detailed arrangement of an illumination component extractor shown in FIG. 2.

FIG. 5 is a block diagram showing a detailed arrangement of the illumination component extractor 61 shown in FIG. 2. As shown in FIG. 5, the illumination component extractor 61 includes smoothing sections 21, 22, and 23, and inverse-smoothing sections 31, 32, and 33. The illumination component extractor 61 shown in FIG. 5 is configured in such a manner that color image data obtained by the image sensor 3 having different spectral sensitivities with respect to each of the pixels is inputted to the smoothing section 21 as input image data; and that luminance image data representing an illumination component of the color image data is outputted from the inverse-smoothing section 31 as output image data.

Each of the smoothing sections 21 through 23 includes a low-pass filter section (LPF section) 210 for performing a filtering operation, and a downsampling section 220 for performing a downsampling operation with a downsampling ratio of n:1, where n is an integer of 2 or more, to generate a plurality of smooth image data having different resolutions from each other. In the following, to simplify the description, the downsampling ratio is set to 2:1. This is merely an example, and other downsampling ratio such as 3:1 or 4:1 may be applied.

The LPF section 210 implements a filtering operation with use of a low-pass filter having a predetermined number of rows and a predetermined number of columns to extract low frequency image data, i.e., a low frequency component from the input image data by: sequentially defining a targeted pixel in the input image data; multiplying the pixel values of the targeted pixel and adjacent pixels adjacent to the targeted pixel by respective corresponding weighting coefficients, i.e. filter coefficients, followed by summation of the products; and dividing the sum of the products by the sum of the filter coefficients. In this embodiment, the LPF section 210 sequentially defines the targeted pixel in such a manner that a raster scan is performed with respect to a frame of image data from the uppermost and leftmost pixel toward the lowermost and rightmost pixel.

A low-pass filter of a relatively small size such as the size of 5×5 or 3×3 is adopted as the low-pass filter. In this embodiment, there is adopted a low-pass filter of the size of 3×3, i.e., a low-pass filter, wherein filter coefficients k1, k1, k3, k4, k5, k6, k7, k8, and k9 are arranged in a matrix of three rows and three columns.

FIG. 6 is a diagram showing an operation to be performed by the LPF section 210. The rectangles shown in FIG. 6 indicate pixels constituting input image data, wherein the first digit of the suffix of the symbol D indicates the position of the pixel in the vertical direction, the second digit of the suffix indicates the position of the pixel in the horizontal direction, and D indicates the pixel value. For instance, in the case where the targeted pixel is located at the position indicated by D11, D11-LPF, which is the pixel value of D11 to be obtained after a filtering operation is performed, is calculated by implementing the following equation:

$$D11\text{-}LPF=(k1*D00+k2*D01+K3*D02+k4*D10+\\k5*D11+k6*D12+k7*D20+k8*D21+k9*D22)/K$$

where K=k1+k2+k3+k4+k5+k6+k7+k8+k9. Then, after the calculation is made, the LPF section 210 defines D12 adjacent to the right of D11 as a next targeted pixel, and calculates LPF-D12. The LPF section 210 implements the above computation with respect to each of the pixels of the input image data, whereby low frequency image data is extracted from the input image data.

The downsampling section 220 performs a downsampling operation with respect to the low frequency image data extracted by the LPF section 210 with a ratio of 2:1 to generate smooth image data whose number of pixels is reduced both in the horizontal direction and the vertical direction to one-half. FIGS. 7A and 7B are diagrams showing an operation to be performed by the downsampling section 220. FIG. 7A shows image data before a downsampling operation is performed, and FIG. 7B shows image data after the downsampling operation is performed. In the case of FIGS. 7A and 7B, image data is subjected to a downsampling operation with a downsampling ratio of 2:1. Accordingly, the pixels are extracted from the image data before a downsampling operation is performed every other pixel in the horizontal direction and the vertical direction by extracting D00, D02, D04, D20, D22, D24, D40, D42, and D44 as shown in FIG. 7B, from the image data before the downsampling operation is performed as shown in FIG. 7A. Thereby, the number of the pixels both in the horizontal direction and the vertical directions is reduced to one-half, and as a result, smooth image data whose total number of the pixels is reduced to one-fourth is generated. In the example of FIGS. 7A and 7B, the pixels of the odd numbers are extracted both in the horizontal direction and the vertical direction. Alternatively, the pixels of the even numbers may be extracted in the horizontal direction and the vertical direction.

Referring back to FIG. 5, similarly to the smoothing section 21, the smoothing sections 22 and 23 each has a LPF section 210 and a downsampling section 220. The smoothing section 22 generates smooth image data D2 based on the smooth image data D1 generated by the smoothing section 21, by performing a similar process as the smoothing section 21; and outputs the smooth image data D2 to the smoothing section 23. The smoothing section 23 then generates smooth image data D3 based on the smooth image data D2 generated by the smoothing section 22, by performing a similar process as the smoothing section 21; and outputs the smooth image data D3 to the inverse smoothing section 33. As described above, the smoothing process is hierarchically executed three times in total by the smoothing sections 21, 22, and 23, whereby the smooth image data D1, D2, and D3 whose resolution is different from each other is generated based on the input image data.

The inverse-smoothing section 33 includes an upsampling section 310 for performing an upsampling operation with an upsampling ratio of 1:2, an edge operating section 320 for performing an edge intensity calculating operation, and a combining section 330 for combining image data to execute an inverse-smoothing process.

The upsampling section 310 performs an upsampling operation with respect to the smooth image data D3 with an upsampling ratio of 1:2, using adjacent pixels to return the pixel number of the smooth image data D3 to the pixel number before the smoothing process is performed by the smoothing section 23. FIGS. 8A and 8B are diagrams showing an upsampling operation. FIG. 8A shows image data before an upsampling operation is performed, and FIG. 8B shows image data after the upsampling operation is performed. In the case of FIGS. 8A and 8B, image data is subjected to an upsampling operation with an upsampling ratio of 1:2. Accordingly, the image data before the upsampling operation is performed as shown in FIG. 8A is interpolated by interpolating the pixel values of three adjacent pixels adjacent to a targeted pixel by the pixel value of the targeted pixel by interpolating the pixel values of three adjacent pixels D01, D10, and D11 adjacent to the right, below, and to the obliquely and downwardly to the right of a targeted pixel D00 by the pixel value of the targeted pixel D00; and interpolating the pixel values of three pixels D03, D12, and D13 adjacent to the right, below, and to the obliquely and downwardly to the right of a next targeted pixel D02 by the pixel value of the targeted pixel D02, as shown in FIG. 8B. Specifically, interpolation is performed by setting D00=D00, D01=D00, D10=D00, D11=D00, D02=D02, D03=D02, D12=D02, and D13=D02. Thereby, the image data before the upsampling operation is performed as shown in FIG. 8A is interpolated every other pixel both in the horizontal direction and the vertical direction, whereby the image size of the image data after the upsampling operation is performed as shown in FIG. 8B is increased by four times.

The upsampling operation to be performed by the upsampling section 310 is not limited to the above, but other various approaches a bilinear interpolation process may be applied.

The edge operating section 320 performs a filtering operation with respect to image data D3' that has been generated by performing an upsampling operation by the upsampling section 310, by using an edge extraction filter having a predetermined size to calculate an edge intensity of the image data D3'. In this embodiment, the edge operating section 320 cal-culates a horizontal edge intensity and a vertical edge intensity of the image data D3' by using a horizontal edge filter for calculating an intensity of a horizontal edge, and a vertical edge filter for calculating an intensity of a vertical edge. The sizes of the horizontal edge filter and the vertical edge filter are preferably a relatively small size in the aspect of increasing the processing rate. In this embodiment, a filter of the size 3×3 may be used.

FIG. 9 is a diagram showing an operation to be performed by the edge operating section 320. In response to input of image data as shown in FIG. 9 as the image data D3', the edge operating section 320 sequentially defines a targeted pixel in such a manner that a raster scan is performed from the uppermost and leftmost pixel toward the lowermost and rightmost pixel, and calculates a horizontal edge intensity and a vertical edge intensity of the image data D3'.

Referring to FIG. 9, in the case where D11 is defined as a targeted pixel, the horizontal edge intensity D11-edgeH of D11 is calculated by implementing the following equation, using eight adjacent pixels:

$$D11\text{-}edgeH = (k1*D00 + k2*D01 + k03*D02 + k4*D10 + k5*D11 + k6*D12 + k7*D20 + k8*D21 + K9*D22)/K$$

where $k1=-1, k2=-1, k3=-1, k4=0, k5=0, k6=0, k7=1, k8=1$, and $k9=1$, and $K=k1+k2+k3+k4+k5+k6+k7+k8+k9$. Horizontal edge intensities with respect to the other pixels are calculated in the same manner as described above.

Similarly to the above, the vertical edge intensity D11-edgeV of D11 is calculated by implementing the following equation, using the eight adjacent pixels:

$$D11\text{-}edgeV = (k1*D00 + k2*D01 + k03*D02 + k4*D10 + k5*D11 + k6*D12 + k7*D20 + k8*D21 + K9*D22)/K$$

where $k1=-1, k2=0, k3=1, k4=-1, k5=0, k6=1, k7=-1, k8=0$, and $k9=1$, and $K=k1+k2+k3+k4+k5+k6+k7+k8+k9$. The aforementioned values of the filter coefficients k1 through k9 are merely an example, and values other than the above may be applied to the filter coefficients k1 through k9 according to needs. Vertical edge intensities with respect to the other pixels are calculated in the same manner as described above.

Referring back to FIG. 5, the combining section 330 generate inversed smooth image data D2' by combining the image data D3' and the smooth image data D2 of the upper layer by replacing the pixel value of a targeted pixel in the image data D3' with the pixel value of the corresponding pixel in the smooth image data D2 of the upper layer in the case where the edge intensity of the targeted pixel in the image data D3' is larger than a predetermined threshold value; and by using the pixel value of the targeted pixel in the image data D3' as it is, in the case where the edge intensity of the targeted pixel in the image data D3' is not larger than the predetermined threshold value.

Specifically, let it be assumed that the threshold value of the horizontal edge intensity is ThH, the threshold value of the vertical edge intensity is ThV, the horizontal edge intensity of a pixel in the image data D3' is EH3, and the vertical edge intensity of the pixel in the image data D3' is EV3. In the case where EH3<ThH and EV3<ThV, the combining section 330 sets D2'=D3'; and unless otherwise, the combining section 330 sets D2'=D2. This enables to extract a low frequency component while preserving an edge portion, which is advantageous in precisely extracting the illumination component without using a low-pass filter of a large size.

The combining process to be performed by the combining section 330 is not limited to the above. Alternatively, for instance, a weighting coefficient "d" ($0 \leq d \leq 1$) depending on the horizontal edge intensity and the vertical edge intensity may be predefined, and a combining process may be performed by implementing the equation:

$$D2'=d*D2+D3'*(1-d).$$

Similarly to the inverse smoothing section 33, each of the inverse smoothing sections 31 and 32 includes an upsampling section 310, an edge operating section 320, and a combining section 330. The inverse smoothing section 32 generates inversed smooth image data D1' based on the inversed smooth image data D2' generated by the inverse smoothing section 33, by performing a similar process as the inverse smoothing section 33, and outputs the inversed smooth image data D1' to the inverse smoothing section 31. Then, the inverse smoothing section 31 generates an illumination component as output image data based on the inversed smooth image data D1' generated by the inverse smoothing section 32, by performing a similar process as the inverse smoothing section 33.

In FIG. 5, image data that has been generated by performing an upsampling operation by the upsampling section 310 in the inverse smoothing section 32 is defined as D2", and image data that has been generated by performing an upsampling operation by the upsampling section 310 in the inverse smoothing section 31 is defined as D1". Alternatively, the downsampling section 220 in the smoothing section 23, and the upsampling section 310 in the inverse smoothing section 33 may be omitted.

Next, an operation to be performed by the image processor 6 is described. In the following, the smoothing sections 21 through 23 each performs a downsampling operation with a downsampling ratio of n:1, where n is an integer of 2 or more; and the inverse smoothing sections 31 through 33 each performs an upsampling operation with an upsampling ratio of 1:n. Input image data is subjected to a smoothing process into the smooth image data D1 by the smoothing section 21 shown in FIG. 5 to reduce the pixel number by $1/n^2$ times. Then, the smooth image data D1 is subjected to a smoothing process into the smooth image data D2 by the smoothing section 22 to reduce the pixel number by $1/n^2$ times. Then, the smooth image data D2 is subjected to a smoothing process into the smooth image data D3 by the smoothing section 23 to reduce the pixel number by $1/n^2$ times. Subsequently, the smooth image data D3 is subjected to an inverse-smoothing process into the inversed smooth image data D2' by the inverse smoothing section 33 to increase the pixel number by $n^2$ times. Then, the inversed smooth image data D2' is subjected to an inverse-smoothing process into the inversed smooth image data D1' by the inverse smoothing section 32 to increase the pixel number by $n^2$ times. Finally, the inversed smooth image data D1' is subjected to an inverse-smoothing process by the inverse smoothing section 31 to increase the pixel number by $n^2$ times, whereby an illumination component is outputted.

In the image processing device in accordance with the first embodiment, smooth image data having a wide wavelength band is extracted from input image data by repeating a smoothing process a certain number of times with use of a relatively small-sized low-pass filter; and then, an illumination component is extracted by repeating an inverse-smoothing process a certain number of times. This enables to extract a low frequency component having a wide wavelength band while preserving an edge portion, without using a large-sized low-pass filter. This is advantageous in precisely extracting the illumination component.

In the first embodiment, the downsampling ratios of the smoothing sections 21 through 23 are respectively set to n:1. Alternatively, the downsampling ratios of the smoothing sections 21 through 23 may be set to different values from each other. In the modification, it is preferable to make the upsampling ratios of the inverse smoothing sections 31, 32, and 33 equal to the upsampling ratios of the smoothing sections 21, 22, and 23, respectively.

In the first embodiment, the number of the smoothing sections is three. Alternatively, the number of the smoothing sections may be two, or more than three. In the modification, the number of the inverse smoothing sections may be set equal to the number of the smoothing sections.

Second Embodiment

In this section, an image pickup apparatus in accordance with a second embodiment of the invention is described. The image pickup apparatus in accordance with the second embodiment has a feature that a downsampling ratio in a smoothing process is set to 2n:1. Elements in the second embodiment substantially identical or equivalent to those in the first embodiment are indicated with the same reference numerals, and description thereof is omitted herein. Since the entire arrangement of the image pickup apparatus, the arrangement of an image processor 6, and the arrangement of an illumination component extractor 61 in the second embodiment are substantially the same as those in the first embodiment, the above arrangements in the second embodiment are described referring to FIGS. 1, 2, and 5.

FIGS. 10A and 10B are diagrams showing a downsampling operation to be performed by a smoothing section 21 in the second embodiment. FIG. 10A shows image data before a downsampling operation is performed, and FIG. 10B shows image data after the downsampling operation is performed. The image data shown in FIG. 10A is image data having an RGB Bayer arrangement. R (red), G (green), and B (blue) respectively indicate the colors of the respective pixels.

As shown in FIG. 10A, R pixels are arranged every other pixel both in the horizontal direction and the vertical direction. For instance, the pixel in the first row and the first column, the pixel in the first row and the third column, the pixel in the third row and the first column, and the pixel in the third row and the third column are R pixels. Similarly to R pixels, B pixels and G pixels are arranged every other pixel both in the horizontal direction and the vertical direction. In the case where one of the B pixels is defined as a targeted pixel, four pixels adjacent to the right and the left of the targeted pixel, and above and below the targeted pixel are G pixels; and four pixels adjacent to the obliquely downwardly to the right and the left of the targeted pixel, and adjacent to the obliquely upwardly to the right and the left of the targeted pixel are R pixels. Thus, a pixel group constituted of the targeted pixel, and the eight adjacent pixels adjacent to the targeted pixel has a predetermined color pattern. Similarly to the case of the B pixels, in the case where one of the R pixels, or one of the G pixels is defined as a targeted pixel, a pixel group constituted of the targeted pixel and the eight adjacent pixels adjacent to the targeted pixel also has a predetermined color pattern.

Therefore, in the case where the downsampling ratio is set to 2n:1, pixels of an identical color are always defined as targeted pixels. Also, as far as the targeted pixels have an identical color, the pixel groups each constituted of the targeted pixel, and the eight adjacent pixels adjacent to the targeted pixel have an identical color pattern. As a result, the sums of the filter coefficients to be applied to the pixels of each of the colors are equal to each other among all the pixel groups. This enables to realize a filtering operation with high precision.

For instance, in the case where the image data shown in FIG. 10A is subjected to a downsampling operation with a downsampling ratio of 2:1, and B11 is defined as a targeted pixel, D00 shown in FIG. 10B is calculated by implementing the following equation:

$$D00=(k1*R00+k2*G01+k3*R02+k4*G10+k5*B11+k6*G12+k7*R20+k8*G21+k9*R22)/K,$$

where K=k1+k2+k3+k4+k5+k6+k7+k8+k9.

Then, in the case where B13 is defined as a targeted pixel, D02 shown in FIG. 10B is calculated by implementing the following equation:

$$D02=(k1*R02+k2*G03+k3*R04+k4*G12+k5*B13+k6*G14+k7*R22+k8*G23+k9*R24)/K.$$

Accordingly, in the case where a downsampling operation is performed with a downsampling ratio of 2:1, the colors of the targeted pixels are always B (blue). The filter coefficients k1, k3, k7, and k9 are always applied to the R pixels, and the filter coefficients k2, k4, k6, and k8 are always applied to the G pixels. Thereby, the sums of the filter coefficients to be applied to the pixels of each of the colors are equal to each other among all the pixel groups.

In the case where the image data shown in FIG. 10A is subjected to a downsampling operation with a downsampling ratio of 4:1, and B33 is defined as a targeted pixel, D00 shown in FIG. 10B is calculated by implementing the following equation:

$$D00=(k1*R22+k2*G23+k3*R24+k4*G32+k5*B33+k6*G34+k7*R42+k8*G43+k9*R44)/K.$$

Then, in the case where B37 is defined as a targeted pixel, D02 shown in FIG. 10B is calculated by implementing the following equation:

$$D02=(k1*R26+k2*G27+k3*R28+k4*G36+k5*B37+k6*G38+k7*R46+k8*G47+k9*R48)/K.$$

Accordingly, in the case where a downsampling operation is performed with a downsampling ratio of 4:1, the colors of the targeted pixels are always B (blue). The filter coefficients k1, k3, k7, and k9 are always applied to the R pixels, and the filter coefficients k2, k4, k6, and k8 are always applied to the G pixels. Thereby, the sums of the filter coefficients to be applied to the pixels of each of the colors are equal to each other among all the pixel groups.

As described above, in the image pickup apparatus in accordance with the second embodiment, by setting the downsampling ratio to 2:1, pixels of an identical color are always defined as targeted pixels, and the sum of the filter coefficients to be applied to the pixels of each of the colors is made the same among all the pixel groups. This enables to precisely extract an illumination component from image data having an RGB Bayer arrangement.

The aforementioned process is not only applied to image data having an RGB Bayer arrangement, but also applied to any image data e.g. image data having a complementary color filter arrangement, as far as the color patterns of pixel groups each constituted of a targeted pixel and adjacent pixels adjacent to the targeted pixel are made identical to each other.

FIG. 12 is a diagram showing image data having a complementary color filter arrangement to be processed. In the case where the image data shown in FIG. 12 is subjected to a downsampling operation with a downsampling ratio of 2:1, similarly to image data having an RGB Bayer arrangement, pixels of an identical color, e.g., Mg (magenta), are always defined as targeted pixels. In this arrangement, by setting the size of a low-pass filter to 3×3, the filter coefficients k1, k3, k7, and k9 are applied to the pixels of Cy (cyan), the filter coefficients k2 and k8 are applied to the pixels of Ye (yellow), and the filter coefficients k4 and k6 are applied to the pixels of G (green). Thereby, the sums of the filter coefficients to be applied to the pixels of each of the colors are equal to each other among all the pixel groups.

In the foregoing embodiment, B pixels are defined as targeted pixels in the image data having the RGB Bayer arrangement, and Mg pixels are defined as targeted pixels in the image data having the complementary color filter arrangement. This is merely an example. Alternatively, even if pixels of a color other than the above are defined as targeted pixels, setting the downsampling ratio to 2n:1 is also advantageous in obtaining substantially the same effect as described above. Further alternatively, use of a low-pass filter of the size, e.g., 5×5, other than the size of 3×3, is also advantageous in obtaining substantially the same effect as described above.

Third Embodiment

In this section, an image pickup apparatus in accordance with a third embodiment of the invention is described. The image pickup apparatus in accordance with the third embodiment is different from those in accordance with the first and the second embodiments in the filter coefficients of a low-pass filter.

Elements in the third embodiment substantially identical or equivalent to those in the first embodiment are indicated with the same reference numerals, and description thereof is omitted herein. Since the entire arrangement of the image pickup apparatus, the arrangement of an image processor 6, and the arrangement of an illumination component extractor 61 in the third embodiment are substantially the same as those in the first embodiment, the above arrangements in the third embodiment are described referring to FIGS. 1, 2, and 5.

Each of the LPF sections 210 shown in FIG. 5 performs a filtering operation with use of a low-pass filter of a kind depending on the color of a targeted pixel. In this embodiment, image data having an RGB Bayer arrangement is used as input image data. Accordingly, in the case where a targeted pixel is an R pixel, an R low-pass filter for red color is used as the LPF section 210; in the case where a targeted pixel is a G pixel, a G low-pass filter for green color is used as the LPF section 210; and in the case where a targeted pixel is a B pixel, a B low-pass filter for blue color is used as the LPF section 210. In this embodiment, the R, G, and B low-pass filters each has the size of 3×3. The filter coefficients of the R low-pass filter are k1 through k9; the filter coefficients of the G low-pass filter are k1' through k9'; and the filter coefficients of the B low-pass filter are k1" through k9".

FIG. 11 is a diagram showing image data having an RGB Bayer arrangement to be processed. In the case where a targeted pixel is B11, since B11 is a B pixel, the B low-pass filter for blue color is used as the LPF section 210; and B11-LPF, which is the pixel value of B11 to be obtained a filtering operation is performed, is calculated by implementing the following equation:

$$B11\text{-}LPF=(k1*R00+k2*G01+K3*R02+k4*G10+k5*B11+k6*G12+k7*R20+k8*G21+k9*R22)/K$$

where K=k1+k2+k3+k4+k5+k6+k7+k8+k9.

In the case where a targeted pixel is G12, since G12 is a G pixel, the G low-pass filter for green color is used as the LPF section 210; and G12-LPF, which is the pixel value of G12 to be obtained after a filtering operation is performed, is calculated by implementing the following equation:

$$G12\text{-}LPF=(k1'*G01+k2'*R02+K3'*G03+k4'*B11+k5'*G12+k6'*B13+k7'*G21+k8'*R22+k9'*G23)/K'$$

where K'=k1'+k2'+k3'+k4'+k5'+k6'+k7'+k8'+k9'.

In the case where a targeted pixel is R22, since R22 is an R pixel, the R low-pass filter for red color is used as the LPF section 210; and R22-LPF, which is the pixel value of R22 to be obtained after a filtering operation is performed, is calculated by implementing the following equation:

$$R22\text{-}LPF=(k1''*B11+k2''*G12+k3''*B13+k4''*G21+k5''*R22+k6''*G23+k7''*B31+k8''*G32+k9''*B33)/K''$$

where K'=k1"+k2"+k3"+k4"+k5"+k6"+k7"+k8"+k9".

The filter coefficients k1 through k9, k1' through k9', and k1" through k9" satisfy the following requirements.

In the case where a B pixel is defined as a targeted pixel, image data having an RGB Bayer arrangement is configured as follows. Specifically, the filter coefficients k1, k3, k7, and k9 are applied to the R pixels, the filter coefficient k5 is applied to the B pixels, and the filter coefficients k2, k4, k6, and k8 are applied to the G pixels. Accordingly, the sum KR of the filter coefficients to be applied to R pixels is: KR=k1+k3+k7+k9; the sum KG of the filter coefficients to be applied to G pixels is: KG=k2+k4+k6+k8; and the sum KB of the filter coefficients to be applied to B pixels is: KB=k5.

In the case where a G pixel is defined as a targeted pixel, image data having an RGB Bayer arrangement is configured as follows. Specifically, the filter coefficients k2' and k8' are applied to R pixels, the filter coefficients k4' and k6' are applied to B pixels, and the filter coefficients k1', k3', k5', k7', and k9' are applied to G pixels. Accordingly, the sum KR' of the filter coefficients to be applied to the R pixels is: KR'=k2'+k8'; the sum KG' of the filter coefficients to be applied to the G pixels is: KG'=k1'+k3'+k5'+k7'+k9'; and the sum KB' of the filter coefficients to be applied to the B pixels is: KB'=k4'+k6'.

In the case where an R pixel is defined as a targeted pixel, image data having an RGB Bayer arrangement is configured as follows. Specifically, the filter coefficient k5" is applied to R pixels, the filter coefficients k1", k3", k7", and k9" are applied to B pixels, and the filter coefficients k2", k4", k6", and k8" are applied to G pixels. Accordingly, the sum KR" of the filter coefficients to be applied to the R pixels is: KR"=k5"; the sum KG" of the filter coefficients to be applied to the G pixels is: KG"=k2"+k4"+k6"+k8"; and the sum KB" of the filter coefficients to be applied to the B pixels is: KB"=k1"+k3"+k7"+k9".

The sums KR, KG, KB, KR', KG', KB', KR", KG", and KB" satisfy the following requirements.

$$KR/K=KR'/K'=KR''/K''$$

$$KG/K=KG'/K'=KG''/K''$$

$$KB/K=KB'/K'=KB''/K''$$

Thereby, the ratios of the filter coefficients to be applied to the pixels are equal to each other among all the pixel groups. This enables to precisely extract a low frequency image data. Alternatively, the sums of the filter coefficients may satisfy: K=K'=K". The modification enables to make the sums of the filter coefficients to be applied to the pixels of an identical color equal to each other among the low-pass filters. Accordingly, the modification is advantageous in precisely extracting a low frequency image data, even if any ratio is applied as the downsampling ratio.

In the following, an operation to be performed by the image pickup apparatus in accordance with the third embodiment is described. In response to input of the input image data having an RGB Bayer arrangement shown in FIG. 11 to the image processor 6, the LPF section 210 in the smoothing section 21 sequentially performs a filtering operation by switching between the R, G, and B low-pass filters depending on the color of a targeted pixel. Then, the downsampling section 220 in the smoothing section 21 performs a downsampling operation with respect to the image data which has undergone the filtering operation with a downsampling ratio of n:1, whereby smooth image data D1 is generated.

Then, the LPF section 210 in the smoothing section 22 performs a filtering operation with respect to the smooth image data D1 generated by the smoothing section 21 in the similar manner as the LPF section 210 of the upper layer. Similarly to the downsampling section 220 of the upper layer, the downsampling section 220 in the smoothing section 22 performs a downsampling operation with a downsampling ratio of n:1, whereby smooth image data D2 is generated. In performing the above operation, the LPF section 210 in the smoothing section 22 may perform a filtering operation by applying the R, G, and B low-pass filters to the image data by defining the pixels whose pixel value has been calculated with use of the R low-pass filter in the smoothing section 21, as R pixels; defining the pixels whose pixel value has been calculated with use of the G low-pass filter in the smoothing section 21, as G pixels; and defining the pixels whose pixel value has been calculated with use of the B low-pass filter in the smoothing section 21, as B pixels.

Subsequently, the smoothing section 23 performs a downsampling operation with a downsampling ratio of n:1 in the similar manner as the smoothing section 22, whereby smooth image data D3 is generated. The smooth image data D3 generated by the smoothing section 23 is sequentially subjected to an inverse-smoothing process by the inverse smoothing sections 33, 32, and 31 in this order with an upsampling ratio of 1:n, whereby an illumination component is outputted.

In the image pickup apparatus in accordance with the third embodiment, the filter coefficients of the R, G, and B low-pass filters are defined to satisfy the requirements that the sums of the filter coefficients to be applied to the pixels of each of the colors are equal to each other among all the pixel groups; and that the sums of the filter coefficients to be applied to the pixels of an identical color are equal to each other among the R, G, and B low-pass filters. A downsampling operation is performed with use of a low-pass filter depending on the color of a targeted pixel. Thereby, the sums of the filter coefficients to be applied to the pixels of each of the colors are equal to each other among all the pixel groups. This enables to precisely extract an illumination component.

The aforementioned process is not only applied to image data having an RGB Bayer arrangement, but also applied to any image data e.g. image data having a complementary color filter arrangement, as far as the color patterns of pixel groups each constituted of a target pixel and adjacent pixels adjacent to the target pixel are identical to each other.

For instance, in the case where the image data having the complementary color filter arrangement shown in FIG. 12 is used as input image data, preparing Cy, Ye, Mg, and G low-pass filters for cyan, yellow, magenta and green, whose filter coefficients satisfy the following requirements; and applying a low-pass filter depending on the color of a targeted pixel by switching between these low-pass filters is advantageous in obtaining substantially the same effect as in the case where image data having an RGB Bayer arrangement is used.

$$KCy/K=KCy'/K'=KCy''/K''=KCy'''/K'''$$

$$KYe/K=KYe'/K'=KYe''/K''=KYe'''/K'''$$

$$KMg/K=KMg'/K'=KMg''/K''=KMg'''/K'''$$

where KCy, KYe, KMg, and KG respectively indicate sums of the filter coefficients to be applied to Cy, Ye, Mg, and G pixels in the case where the Cy low-pass filter is used;

KCy', KYe', KMg', and KG' respectively indicate sums of the filter coefficients to be applied to Cy, Ye, Mg, and G pixels in the case where the Ye low-pass filter is used;

KCy'', KYe'', KMg'', and KG'' respectively indicate sums of the filter coefficients to be applied to Cy, Ye, Mg, and G pixels in the case where the Mg low-pass filter is used; and KCy''', KYe''', KMg''', and KG''' respectively indicate sums of the filter coefficients to be applied to Cy, Ye, Mg, and G pixels in the case where the G low-pass filter is used. Alternatively, the sums of the filter coefficients may satisfy: $K=K'=K''=K'''$.

The foregoing description is made on the premise that a low-pass filter is changed each time the color of a targeted pixel is changed. Alternatively, for instance, use of a low-pass filter whose filter coefficients satisfy: $k1=1$, $k2=2$, $k3=1$, $k4=2$, $k5=4$, $k6=2$, $k7=1$, $k8=2$, and $k9=1$ enables to set the ratio of the sum of the filter coefficients to be applied to the pixels of each of the colors to a fixed value, thereby enabling to obtain substantially the same effect as described above, without changing a low-pass filter depending on the color of a targeted pixel.

Specifically, in the case where the modified low-pass filter is applied to image data having an RGB Bayer arrangement, and a B pixel is defined as a targeted pixel, the pixel value of the B pixel to be obtained after a filtering operation is performed is: $(4B+4R+8G)/16$. In this example, R, G, and B, respectively indicate sums of pixel values of R pixels, G pixels, and B pixels in the image data to be processed by the low-pass filter by a one-time process. In the case where an R pixel is defined as a targeted pixel, the pixel value of the R pixel to be obtained after a filtering operation is performed is: $(4R+4B+8G)/16$. In the case where a G pixel is defined as a targeted pixel, the pixel value of the G pixel to be obtained after a filtering operation is performed is: $(8G+4R+4B)/16$. Accordingly, the sums KR, KG, and KB of the filter coefficients to be applied to R pixels, G pixels, and B pixels are: $KR=4$, $KG=8$, and $KB=4$, without changing the low-pass filter depending on the color of a targeted pixel. Thereby, the sums of the filter coefficients to be applied to the pixels of each of the colors are equal to each other among all the pixel groups. This enables to precisely extract low frequency image data, even if any ratio is applied as a downsampling ratio. Applying the low-pass filters to image data having a complementary color filter arrangement is also advantageous in obtaining substantially the same effect as described above, because $KCy=4$, $KYe=4$, $KMg=4$, and $KG=4$.

The following is a summary of the technical features of the embodiments.

(1) The above image processing device comprises: an illumination component extractor for extracting an illumination component from input image data; a reflectance component extractor for extracting a reflectance component from the input image data based on the illumination component extracted by the illumination component extractor; a compressor for compressing a dynamic range of the illumination component extracted by the illumination component extractor; and a combiner for combining the illumination component whose dynamic range is compressed by the compressor with the reflectance component extracted by the reflectance component extractor. The illumination component extractor is provided with: a smoothing section for performing a smoothing process a certain number of times to generate a plurality of smooth image data having resolutions different from one another from the input image data, the smoothing section including a filtering section for filtering the input image data with use of a low-pass filter having a predetermined size, and a downsampling section for downsampling the filtered input image data; and an inverse-smoothing section for performing an inverse-smoothing process a certain number of times, the inverse-smoothing section including an edge operating section for replacing an edge portion of a smooth image data having a lower resolution with a smooth image data having a higher resolution, and an upsampling section for upsampling the replaced smooth image data. The input image data is color image data which has been obtained by an image sensor including a number of pixels having different spectral sensitivities.

The illumination component is extracted from the input image data by performing the smoothing process a certain number of times to generate a plurality of smooth image data having resolutions different from one another from the input image data, and the inverse-smoothing process a certain number of times. This enables to precisely extract the illumination component from the color image data, without using a low-pass filter of a large size.

(2) Preferably, the color image data may include image data having an RGB Bayer arrangement.

The above arrangement enables to precisely extract the illumination component from the image data having the RGB color Bayer arrangement.

(3) Preferably, the color image data may include image data having a complementary color filter arrangement.

The above arrangement enables to precisely extract the illumination component from the image data having the complementary color filter arrangement.

(4) Preferably, the illumination component extractor may perform the downsampling operation with a ratio of $2n:1$, where n is a positive integer.

In the above arrangement, since the downsampling process is performed with the ratio of $2n:1$, targeted pixels are defined every other 2n in a horizontal direction and a vertical direction. The pixels of an identical color are always defined as the targeted pixels, and the color patterns of pixel groups each constituted of the targeted pixel, and adjacent pixels adjacent to the targeted pixel are always made identical to each other among all the pixel groups by a cyclic repetition of the color pattern of the image data having the RGB Bayer arrangement, or the image data having the complementary color filter arrangement. As a result, the sums of filter coefficients of the low-pass filter to be applied to the pixels of each of the colors are equal to each other among all the pixel groups, thereby enabling to precisely extract the illumination component.

(5) Preferably, the low-pass filter may have filter coefficients satisfying that sums of the filter coefficients to be applied to pixels of each of the colors are equal to each other among all pixel groups.

In the above arrangement, since the filter coefficients are defined to satisfy that the sums of the filter coefficients to be applied to the pixels of each of the colors are equal to each other among all the pixel groups. This enables to precisely extract the illumination component, even if any ratio is applied as the downsampling ratio.

(6) Preferably, the illumination component extractor may perform the filtering operation with use of the low-pass filter for the color of a targeted pixel.

In the above arrangement, since the low-pass filter of the kind depending on the color of the targeted pixel is used, the illumination component can be precisely extracted, even if any ratio is applied as the downsampling ratio.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image processing device comprising:
   an illumination component extractor for extracting an illumination component from input image data;
   a reflectance component extractor for extracting a reflectance component from the input image data based on the illumination component extracted by the illumination component extractor;
   a compressor for compressing a dynamic range of the illumination component extracted by the illumination component extractor; and
   a combiner for combining the illumination component whose dynamic range is compressed by the compressor with the reflectance component extracted by the reflectance component extractor,
   wherein:
   the illumination component extractor is provided with:
      a smoothing section for performing a smoothing process a certain number of times to generate a plurality of smooth image data having resolutions different from one another from the input image data, the smoothing section including a filtering section for filtering the input image data with use of a low-pass filter, and a downsampling section for downsampling the filtered input image data; and
      an inverse-smoothing section for performing an inverse-smoothing process a certain number of times, the inverse-smoothing section including an edge operating section for replacing an edge portion of a smooth image data having a lower resolution with a smooth image data having a higher resolution, and an upsampling section for upsampling the replaced smooth image data.

2. The image processing device according to claim 1, wherein the input image data is color image data which has been obtained by an image sensor including a number of pixels having different spectral sensitivities.

3. The image processing device according to claim 2, wherein the color image data includes image data having an RGB Bayer arrangement.

4. The image processing device according to claim 2, wherein the illumination component extractor performs the downsampling operation with a ratio of 2n:1, where n is a positive integer.

5. The image processing device according to claim 3, wherein the low-pass filter is provided with filter coefficients for each of the colors, sums of filter coefficients being equal to each other.

6. The image processing device according to claim 5, wherein the illumination component extractor performs the filtering operation with use of a low-pass filter for the color of a targeted pixel.

7. The image processing device according to claim 2, wherein the color image data includes image data having a complementary color filter arrangement.

8. An image processing method comprising:
   an illumination component extracting step of extracting an illumination component from input image data;
   a reflectance component extracting step of extracting a reflectance component from the input image data based on the illumination component extracted in the illumination component extracting step;
   a compressing step of compressing a dynamic range of the illumination component extracted in the illumination component extracting step; and
   a combining step of combining the illumination component whose dynamic range is compressed in the compressing step with the reflectance component extracted in the reflectance component extracting step,
   wherein:
   the illumination component is extracted from the input image data by:
      performing a smoothing process a certain number of times to generate a plurality of smooth image data having resolutions different from one another from the input image data, the smoothing process including an operation of filtering the input image data with use of a low-pass filter and an operation of downsampling the filtered input image data; and
      performing an inverse-smoothing process a certain number of times, the inverse-smoothing process including an operation of replacing an edge portion of a smooth image data having a lower resolution with a smooth image data having a higher resolution, and an operation of upsampling the replaced smooth image data.

9. The image processing method according to claim 8, wherein the input image data is color image data which has been obtained by an image sensor including a number of pixels having different spectral sensitivities.

10. The image processing method according to claim 9, wherein the color image data includes image data having an RGB Bayer arrangement.

11. The image processing method according to claim 10, wherein the illumination component extractor performs the downsampling operation with a ratio of 2n:1, where n is a positive integer.

12. The image processing method according to claim 10, wherein the low-pass filter is provided with filter coefficients for each of the colors, sums of filter coefficients being equal to each other.

13. The image processing method according to claim 12, wherein the illumination component extractor performs the filtering operation with use of a low-pass filter for the color of a targeted pixel.

14. The image processing method according to claim 9, wherein the color image data includes image data having a complementary color filter arrangement.

15. An image pickup apparatus comprising:
   an image processing device including:
   an illumination component extractor for extracting an illumination component from input image data;
   a reflectance component extractor for extracting a reflectance component from the input image data based on the illumination component extracted by the illumination component extractor;
   a compressor for compressing a dynamic range of the illumination component extracted by the illumination component extractor; and
   a combiner for combining the illumination component whose dynamic range is compressed by the compressor with the reflectance component extracted by the reflectance component extractor,
   wherein:
   the illumination component extractor is provided with:
      a smoothing section for performing a smoothing process a certain number of times to generate a plurality of smooth image data having resolutions different from one another from the input image data, the smoothing section including a filtering section for filtering the input image data with use of a low-pass filter, and a downsampling section for downsampling the filtered input image data; and an inverse-smoothing section for performing an inverse-smoothing process a certain number of times, the inverse-smoothing section including an edge operating section for replacing an edge portion of a smooth image data having a lower resolution with a smooth image data having a higher resolution, and an upsampling section for upsampling the replaced smooth image data.

16. The image pickup apparatus according to claim 15, wherein the color image data includes image data having an RGB Bayer arrangement.

17. The image pickup apparatus according to claim 16, wherein the illumination component extractor performs the downsampling operation with a ratio of 2n:1, where n is a positive integer.

18. The image pickup apparatus according to claim 16, wherein the low-pass filter is provided with filter coefficients for each of the colors, sums of filter coefficients being equal to each other.

19. The image pickup apparatus according to claim 18, wherein the illumination component extractor performs the filtering operation with use of a low-pass filter for the color of a targeted pixel.

20. The image pickup apparatus according to claim 15, wherein the color image data includes image data having a complementary color filter arrangement.

21. The image pickup apparatus according to claim 15, wherein the input image data is color image data which has been obtained by an image sensor including a number of pixels having different spectral sensitivities.

* * * * *